(12) United States Patent
Wong

(10) Patent No.: US 7,915,772 B2
(45) Date of Patent: Mar. 29, 2011

(54) MOTOR FOR VEHICLE DOOR LOCK

(75) Inventor: Ben To Fan Wong, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 201 days.

(21) Appl. No.: 12/356,915

(22) Filed: Jan. 21, 2009

(65) Prior Publication Data

US 2009/0184608 A1  Jul. 23, 2009

(30) Foreign Application Priority Data

Jan. 18, 2008  (CN) .......................... 2008 1 0065085

(51) Int. Cl.
*H02K 11/00* (2006.01)
(52) U.S. Cl. .................................... 310/68 B
(58) Field of Classification Search ................ 310/68 B, 310/68 R, 239
See application file for complete search history.

(56) References Cited

U.S. PATENT DOCUMENTS

| 6,127,752 | A | * | 10/2000 | Wiesler | 310/68 B |
| 6,998,741 | B2 | * | 2/2006 | Breynaert et al. | 310/68 B |
| 2005/0040718 | A1 | * | 2/2005 | Sesselmann | 310/89 |

* cited by examiner

*Primary Examiner* — Nguyen N Hanh
(74) *Attorney, Agent, or Firm* — Muncy, Geissler, Olds & Lowe, PLLC

(57) ABSTRACT

A motor of a door lock for a vehicle comprises: a motor housing; an end cap fixed to the motor housing; and a rotation detector. The motor housing accommodates an armature including a motor shaft and a commutator. A sensor magnet is fixed to the motor shaft and the rotation detector comprises a rotation sensor fixed to a circuit board fixed to an inner part of the end cap and disposed adjacent the sensor magnet for sensing rotation of the magnet to produce a corresponding signal. A sensor connector fixed to the circuit board and electrically connected with the rotation sensor; connects to signal wires which transfer the signal to a microprocessor of the vehicle.

9 Claims, 4 Drawing Sheets

MOTOR FOR VEHICLE DOOR LOCK

CROSS REFERENCE TO RELATED APPLICATIONS

This non-provisional patent application claims priority under 35 U.S.C. §119(a) from Patent Application No. 200810065085.6 filed in The People's Republic of China on Jan. 18, 2008.

FIELD OF THE INVENTION

The present invention relates to electric motors and in particular, to a motor with a built-in rotation detector or position sensor for vehicle door locks.

BACKGROUND OF THE INVENTION

For vehicles, the door lock is a major item of concern for safety issues. Before driving or leaving a vehicle unattended, drivers usually need to confirm whether or not the doors are locked.

In a vehicle door lock device of conventional art, an additional micro motor is used to confirming whether the vehicle door lock is in the locked or unlock position. However, this additional motor raises the cost of the vehicle door lock.

Hence, there is a desire for a motor for a door lock which can provide feedback about the state of the lock or which at least provides the public with a useful choice

SUMMARY OF THE INVENTION

Hence there is a desire for a motor for a door lock which can verify its position.

Accordingly, in one aspect thereof, the present invention provides a motor for a vehicle door lock comprising: a motor housing; an end cap fixed to the motor housing; and a rotation detector, the motor housing accommodating an armature including a motor shaft, a rotor core and a commutator, wherein a sensor magnet is fixed to the motor shaft and the rotation detector comprises a circuit board fixed to an inner part of the end cap, a rotation sensor fixed to the circuit board and adjacent the sensor magnet for sensing rotation of the magnet to produce a corresponding signal, and a sensor connector fixed to the circuit board and being electrically connected with the rotation sensor, the sensor connector being arranged to be connected to signal wires to transfer the signal to a microprocessor of the vehicle.

Preferably, sensor connector comprises a pair of terminals, each terminal having at least one spring plate, and the terminals contact a respective connector of the signal wire by the spring plates.

Preferably, the end cap is provided with a first pair of through holes for connectors of the signal wires to pass through from outside of the end cap, to make contact with the sensor connector.

Preferably, the end cap is provided with a second pair of through holes for connectors of power supply wires to pass through from outside of the end cap to supply power to the motor, the second pair of through holes is axially spaced from the first pair of through holes.

Preferably, the end cap comprises multiple resilient terminal links to connect the power supply to brushes of the motor and to the rotation detector.

Preferably, the rotation sensor is a Hall sensor, and the rotation detector also comprises a current-limiting resistor fixed to the circuit board and being electrically connected with the Hall sensor.

Preferably, the end cap is provided with a pair of slots for slidably receiving two sides of the circuit board.

Preferably, an edge of the circuit board is provided with an opening, and the end cap is provided with a resilient catch or hook which engages the opening to prevent accidental removal of the circuit board from the slots of the end cap.

Preferably, the sensor magnet is a plastic magnet keyed to at least one axially extending projection provided on an axial end of the commutator adjacent the sensor magnet.

Preferably, the motor for door lock also comprises an oil slinger pressed on to the shaft and located adjacent the sensor magnet on the side remote from the commutator, the outer diameter of the oil slinger being bigger than or equal to the outer diameter of the sensor magnet.

Advantages of embodiments of the present invention include a saving in cost o the overall vehicle door lock system. When the motor is rotating, the Hall sensor detects the changes of the magnetic poles of the magnet to produce a voltage signal which changes between high and low potential. A microprocessor processing the signal, counts the changes in polarity to calculate the number of turns of the armature to determine whether or not the vehicle door is correctly locked. Compared with conventional systems, a motor can be saved, reducing the overall cost of the door lock. By mounting the position sensor in the end cap of the motor, the position sensor occupies little space.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DESCRIPTION OF THE PREFERRED EMBODIMENT

The motor for a vehicle door lock according to the preferred embodiment of the present invention, as shown in FIGS. 1 to 6, comprises a motor housing 10, an end cap 30, and a rotation detector 50 fixed to the end cap 30.

Figure 5:
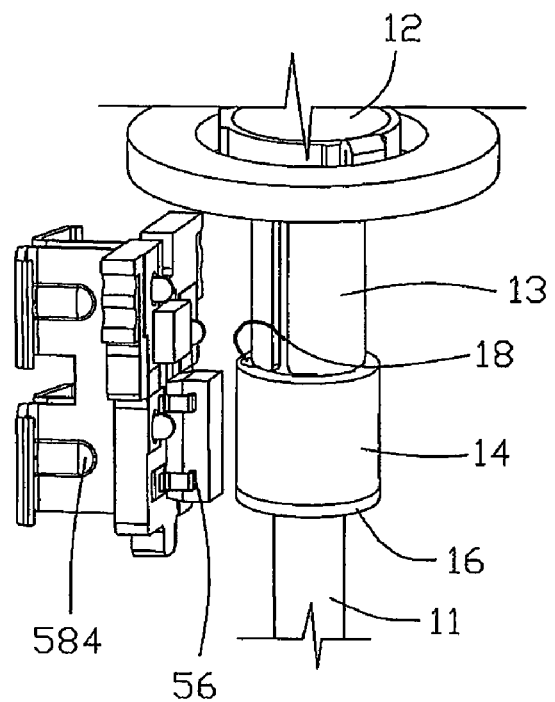
FIG. 5 is a schematic diagram illustrating the arrangement of the rotation detector.

As shown in FIG. 5, the motor housing 10 comprises an armature 12 having a shaft 11, a commutator 13, a sensor magnet 14 fixed to the shaft 11 adjacent the commutator 13, and an oil slinger 16 fixed to the shaft 11 adjacent the sensor magnet 14. Multiple axial projections 18 are provided on an axial end face of the commutator 13. The sensor magnet 14 is a the plastic cylinder shape magnet which is pressed on to the shaft 11 and has axial recesses which tightly engage the axial projection 18 to key the magnet to the armature to prevent relative rotational movement there between. The sensor magnet 14 has a pair of south and north poles.

The shaft 11 is journalled in bearings in the end cap and motor housing. The oil slinger 16 is arranged to stop oil migrating along the shaft from the bearing in the end cap and contaminating the commutator 13. Ideally, the outer diameter of the oil slinger 16 is bigger than or equal to the outer diameter of the sensor magnet 14.

Figure 1:
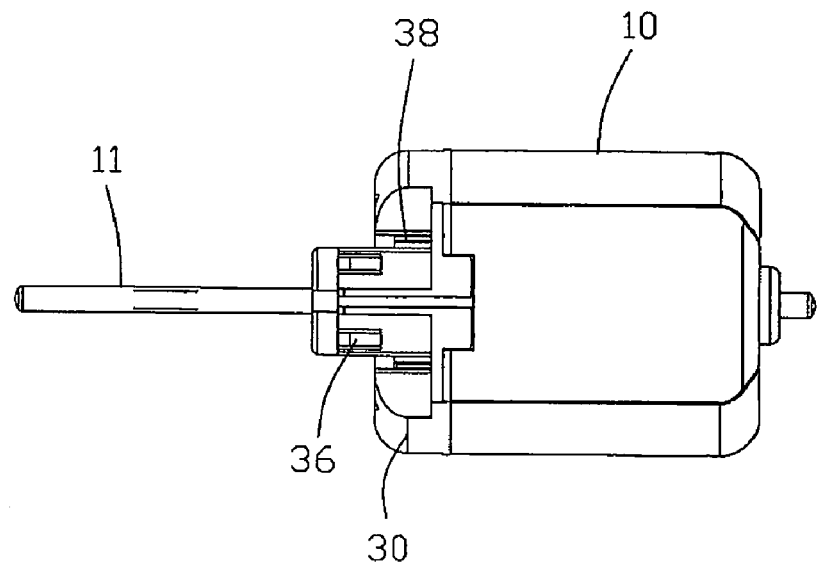
FIG. 1 is a side elevation of a motor for a vehicle door lock according to the preferred embodiment of the present invention.
Figure 2:
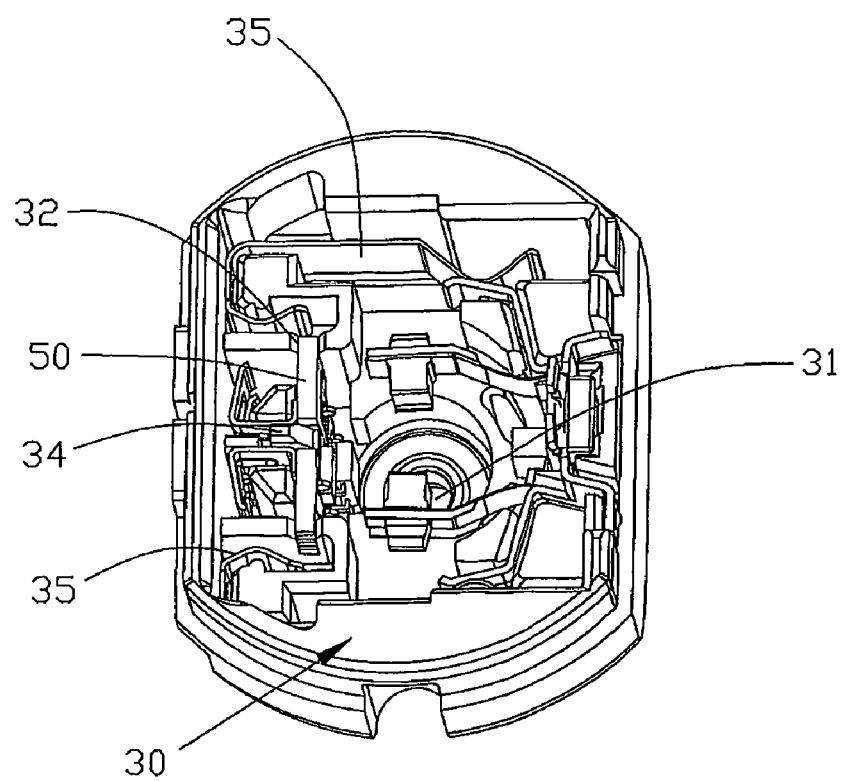
FIG. 2 is an isometric view of the inside of an end cap of the motor of FIG. 1 showing a rotation detector.

Referring to FIG. 2, the end cap 30 is made of a plastics material and has a central through hole 31 for accommodating the shaft 11 of the motor. A pair of slots 32 is provided on the inside surface of the end cap 30 adjacent the central through hole 31, for mounting the rotation detector 50. The end cap 30 is also provided with a resilient catch 34 to retain the rotation detector 50 in the slots 32. Terminal links 35 connect brush gear of the motor with an external power supply. The end cap 30 is also provided with two pairs of through holes 36, 38 (as shown in FIG. 1), of which one pair 36 is for connectors of the signal wires, and the other pair 38 is for the power supply connectors.

Figure 3:
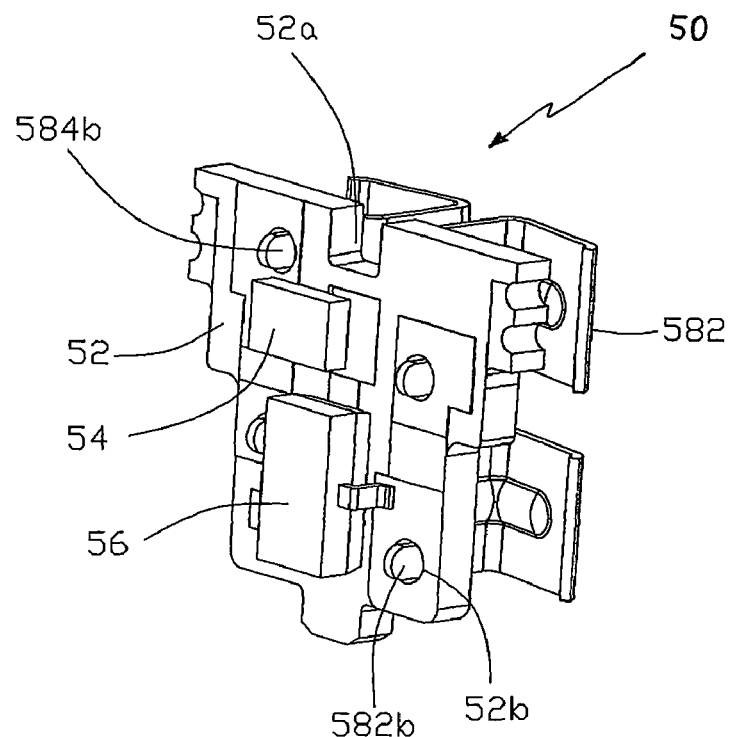
FIG. 3 is an isometric view of the rotation detector of FIG. 2.
Figure 4:
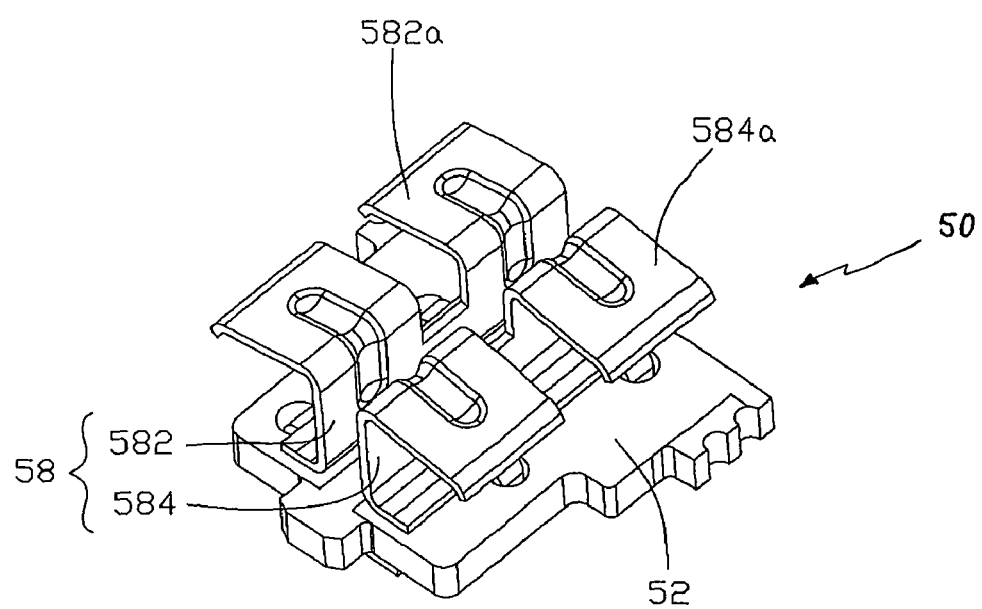
FIG. 4 is an isometric view from a different angle of the rotation detector of FIG. 3.

Referring to FIG. 3 and FIG. 4, the rotation detector 50 comprises a circuit board 52, a current-limiting resistor 54, a Hall sensor 56, and a sensor connector 58. The current-limiting resistor 54 and the Hall sensor 56 are fixed at one side of the circuit board 52 by soldering, preferably using a surface mounting technique (SMT). The current-limiting resistor 54 is electrically connected in series with the Hall sensor 56 to protect the Hall sensor 56 from over current. One edge of the circuit board 52 is provided with an opening 52*a*. The sensor connector 58 comprises two terminals 582, 584, and each terminal comprises two spring plates 582*a*, 584*b*. Connecting feet 582*b*, 584*b* extend from each spring plate. The connecting feet 582*b*, 584*b* are each inserted through and soldered to corresponding holes 52*b* of the circuit board 52. Each spring plate of one terminal 582 is located opposite to the corresponding spring plate of the other terminal 584. The sensor connector is thus electrically connected to the Hall sensor 56 via the circuit board 52.

Figure 6:
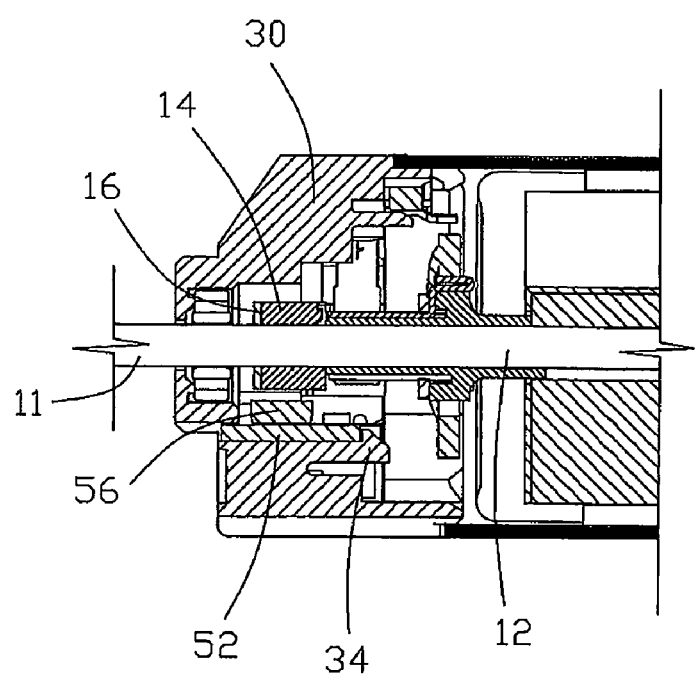
FIG. 6 is a sectional view of a part of the motor of FIG. 1.

After rotation detector 50 is inserted into the slots 32 of the end cap 30, the resilient catch 34 of the end cap 30 is located in the opening 52*a* of the circuit board 52 (as shown in FIG. 2, FIG. 6), so as to prevent the rotation detector 50 from accidentally separating from the end cap 30. Connectors of the signal wires pass through the first pair of through holes 36 of the end cap 30 to electrically connect with the terminals of the sensor connector 58 of the rotation detector 50, and the other end of the signal wires are connected to the control panel of the vehicle. Connectors of the power supply wires connected to an external power supply pass through the second pair of through holes 38 of the end cap 30 and connect with terminal links 35 of the end cap 30 to supply power to the brush gear. Should the circuit board 52 require power, it may be connected to the connectors of the power supply wires either directly or by the terminal links 35. The motor shaft 11 passes through the through hole 31 of the end cap 30 and the end cap 30 is fixed to the motor housing 10. Thus the Hall sensor 56 is located adjacent the sensor magnet 14 (as shown in FIG. 5 and FIG. 6).

Figure 7:
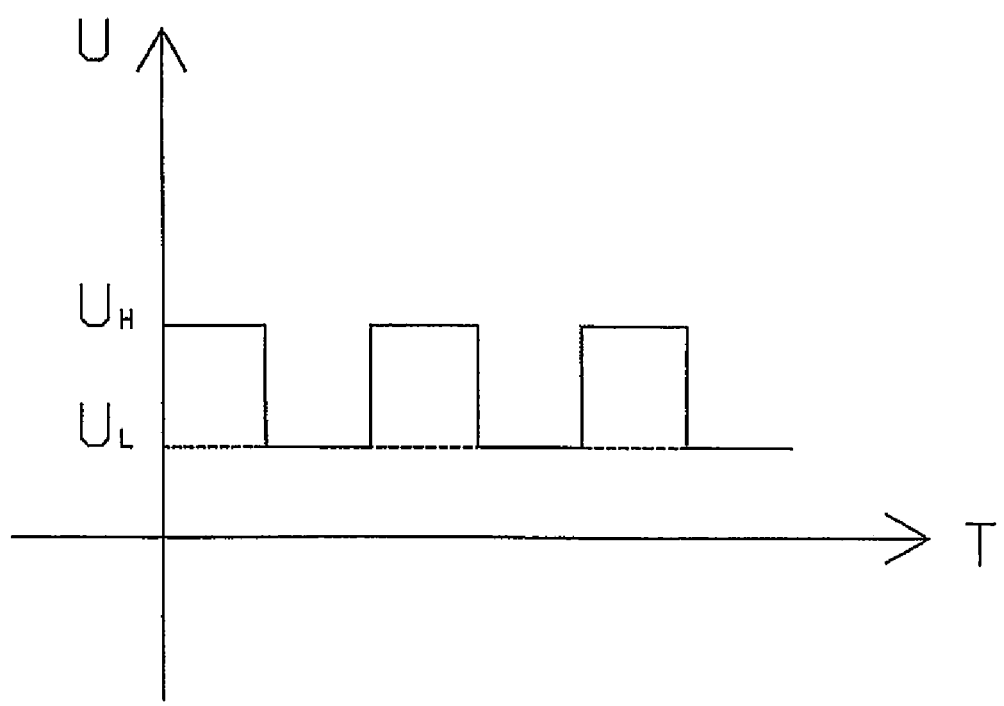
FIG. 7 is a graph showing the waveform of a voltage signal produced by the rotation detector.

When user locks a vehicle door, the armature 12 will rotate for multiple turns. In each turn the armature 12 rotates, the Hall sensor 56 will be influenced by each of the North and South poles of the sensor magnet 14 for one time, so as to produce a voltage signal with changes of high and low potential. When the armature 12 rotates for multiple turns, the Hall sensor 56 will produce a voltage signal with continuous changes of high and low potential as shown in FIG. 7. The signal is sent to the microprocessor of the vehicle control panel via the signal wires, and the microprocessor processes the signal to determine the number of revolutions made by the armature 12 and accordingly, determines whether or not the vehicle door is locked. Thus compared with conventional art, the total cost of the vehicle door lock is reduced by reducing the number of motors in each assembly. Also, as the rotation detector 50 is inserted in the slots on the inside of the end cap 30, it occupies little space.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow. For example, the sensor magnet may have more than one pair of magnetic poles and thus each full turn of the armature will produce a corresponding number of pulses in the signal from the Hall sensor.

The invention claimed is:

1. A motor for vehicle door lock comprising: a motor housing; an end cap fixed to the motor housing; and a rotation detector, the motor housing accommodating an armature including a motor shaft, a rotor core, a commutator, and a sensor magnet fixed to the motor shaft, wherein the rotation detector comprises a circuit board fixed to an inner part of the end cap, a rotation sensor fixed to the circuit board and adjacent the sensor magnet for sensing rotation of the magnet to produce a corresponding signal, and a sensor connector fixed to the circuit board and being electrically connected with the rotation sensor, the sensor connector being arranged to be connected to signal wires for transferring the signal to a microprocessor of a vehicle control panel;

wherein the sensor connector comprises a pair of terminals, each terminal comprising at least one spring plate, and each terminal contacts a respective connector of the signal wire by the spring plates.

2. The motor of claim 1, wherein the end cap is provided with a first pair of through holes for connectors of the signal wires to pass through from outside of the end cap, to make contact with the sensor connector.

3. The motor of claim 2, wherein the end cap is provided with a second pair of through holes for connectors of power supply wires to pass through from outside of the end cap to supply power to the motor, the second pair of through holes being axially spaced from the first pair of through holes.

4. The motor of claim 1, wherein the end cap comprises multiple resilient terminal links to connect the power supply to brushes of the motor and to the rotation detector.

5. The motor of claim 1, wherein the rotation sensor is a Hall sensor, and the rotation detector also comprises a current-limiting resistor fixed to the circuit board and being electrically connected with the Hall sensor.

6. The motor of claim 1, wherein the end cap is provided with a pair of slots for slidably receiving two sides of the circuit board.

7. The motor of claim 6, wherein an edge of the circuit board is provided with an opening and the end cap is provided with a resilient catch which engages the opening to prevent accidental removal of the circuit board from the slots of the end cap.

8. The motor of claim 1, wherein the sensor magnet is a plastic magnet keyed to at least one axially extending projection provided on an axial end of the commutator adjacent the sensor magnet.

9. The motor of claim 1, wherein the motor further comprises an oil slinger pressed on to the shaft and located adjacent the sensor magnet on the side remote from the commutator, the outer diameter of the oil slinger being bigger than or equal to the outer diameter of the sensor magnet.

* * * * *